United States Patent
Ciungan

[15] 3,656,779
[45] Apr. 18, 1972

[54] DEFLECTION BAR UNIT FOR SNOWMOBILES

[72] Inventor: Virgil Ciungan, 9792 Buckingham, Allen Park, Mich. 48101

[22] Filed: June 30, 1970

[21] Appl. No.: 51,130

[52] U.S. Cl............................................280/150 B, 296/102
[51] Int. Cl............................................................B60r 19/00
[58] Field of Search......................280/150 R, 150 C, 150 B; 296/102; 180/5 R

[56] References Cited

UNITED STATES PATENTS

| | | | |
|---|---|---|---|
| 1,107,832 | 8/1914 | Palis | 280/150 R |
| 3,402,941 | 9/1968 | Martinmaas | 280/150 C |
| 3,552,514 | 5/1971 | Alpers | 280/150 C |

Primary Examiner—Benjamin Hersh
Assistant Examiner—Robert R. Song
Attorney—Whittemore, Hulbert & Belknap

[57] ABSTRACT

An upwardly and rearwardly extending deflection bar device is mounted before the windshield of a conventional winter sport or recreation vehicle, extending above the driver and a possible passenger to protect from danger of injury occasioned by his striking fence wires or other low-lying objects on property traversed by the vehicle. An upward or downward adjustment of the protective bar unit at an upright mast portion thereof accommodates a kneeling posture of the driver; and an adjustable rearward extension of a generally horizontal portion of the unit affords protection to both the driver and an occupant of the vehicle behind him. Single bar and dual forked bar versions of the unit are shown.

14 Claims, 5 Drawing Figures

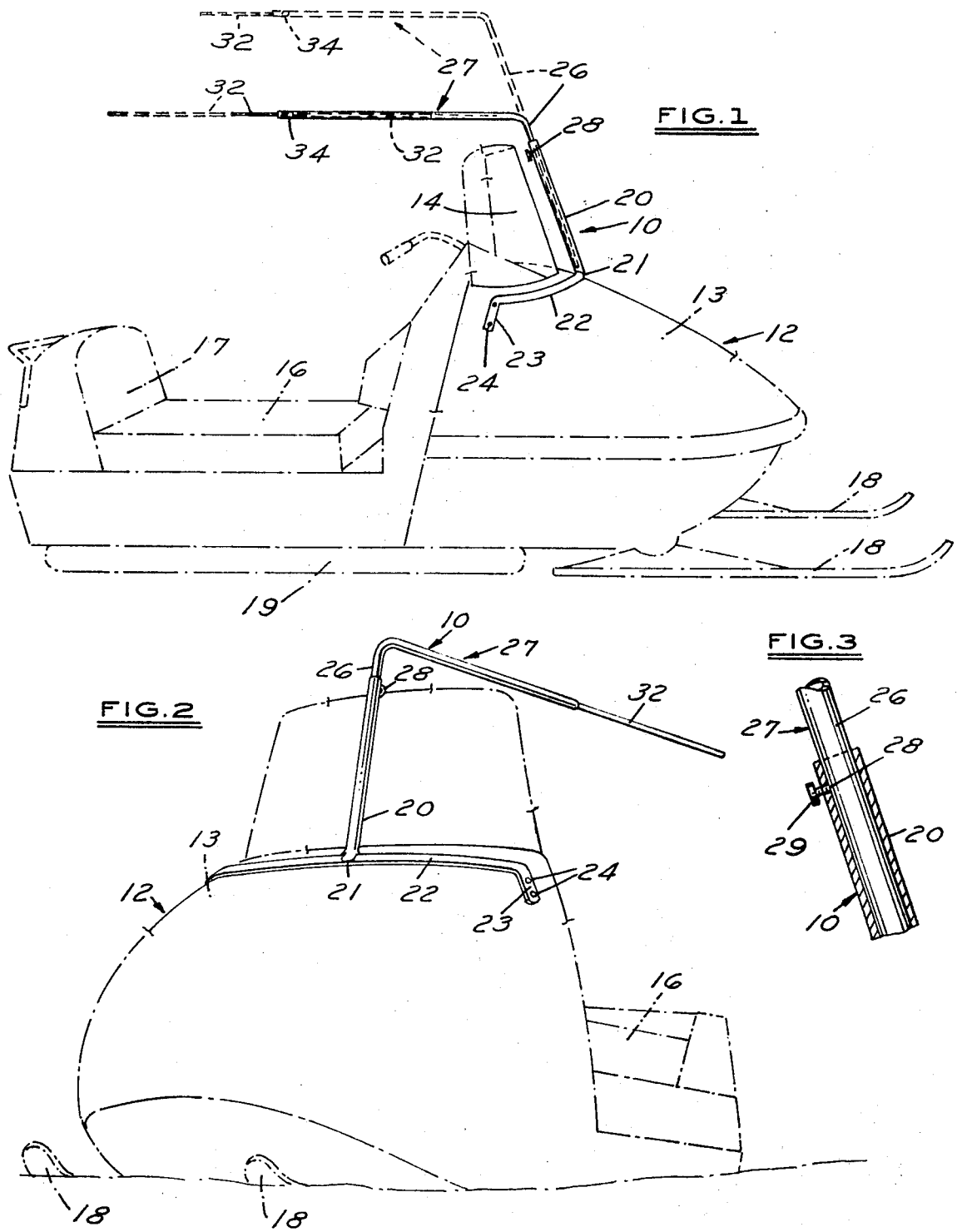

INVENTOR
VIRGIL CIUNGAN

BY Whittemore, Hulbert & Belknap
ATTORNEYS

3,656,779

DEFLECTION BAR UNIT FOR SNOWMOBILES

BACKGROUND OF THE INVENTION

1. Field of the Invention

The invention relates specifically to the recently burgeoning recreation of motor-driven overland transportation by snowmobile, and to the elimination of the hazard of serious injury or death presented to the driver and possible passenger of the sometimes rapidly traveling vehicle, due to an unexpected encountering of low over-hanging fence wires, cables and the like.

2. Description of the Prior Art

A search of the prior art has revealed as the most pertinent thereof the U.S. Pats. to Palis, No. 1,107,832 of Aug. 18, 1940, relating to a rigid protective device for an automotive road vehicle; Overbeck, No. 1,614,856, involving the mounting of saw blades, again rigidly, at the front of the vehicle; and Selby, No. 2,805,887 of Sept. 10, 1957, disclosing a rigid canopy guard for a tractor mounted at the rear of the vehicle to extend across its top and towards its front. None of these devices relate to an adjustable sort of protective device, much less the dually adjustable one which is the subject matter of the present invention.

SUMMARY OF THE INVENTION

The invention comprises a deflection bar unit for a snowmobile which may optionally be of a single tubular bar or dual bar type in a V-shaped outline. In either case, it mounts to the body hood or bonnet of the vehicle just forwardly of and upwardly parallel to the latter's windshield, thence extending rearwardly and generally parallel to the ground surface over the occupant or occupants.

In accordance with the invention, the bar structure is dually adaptable, in that it permits an upward or downward adjustability enabling the driver to assume either a sitting or a kneeling posture, as is common in the driving of this type of vehicle; and it also enables a rearward extension of the length of the horizontal arm or rod member unit in order to protect an occupant behind the driver. Slidably telescoped upright tubular mast parts and horizontal tubular front-to-rear parts provide these optional adjustments; and knurled head set-screws clamp the parts rigidly in their adjusted positions. When the snowmobile is being operated on an established trail or is to be stored, upper mast and horizontal extension components may be removed as unnecessary. The dual rod version of the deflection bar structure enables the operator to stand erect at the controls without head interference.

In general, the features of the deflection bar unit of the invention are of a very simple and inexpensive nature, and well suited to the mounting of either version of the unit on snowmobiles of various known manufactures. The unit is extremely compact, and presents little or no interference with the field of vision of the driver, while affording protection against grave danger of serious physical injuries, indeed, of virtual decapitation and death, such as have occurred in the past.

BRIEF DESCRIPTION OF THE DRAWINGS

FIG. 1 is a view in side elevation illustrating a single bar embodiment of the invention as operatively mounted to a known type of snowmobile, illustrated in the main in dotted lines;

FIG. 2 is a front perspective view of this type of installation;

FIG. 3 is a fragmentary enlarged scale view illustrating the preferred adjustable, axially telescoping and set-screw locking arrangement permitting a vertical positioning of the protective bar structure as desired, as illustrated in solid and dotted line in FIG. 1;

DESCRIPTION OF PREFERRED EMBODIMENTS

Figure 4:
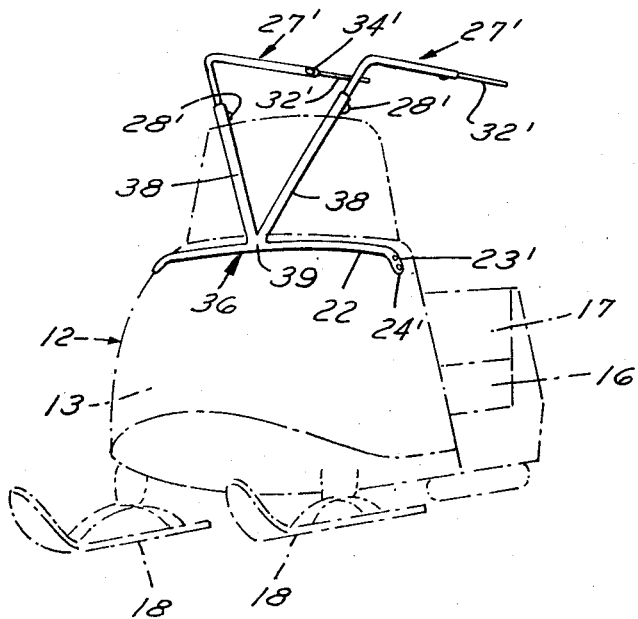
FIG. 4 is a front perspective view, similar to FIG. 2, but of a dual bar embodiment of the invention.

FIGS. 1, 2, and 3 illustrate a simple embodiment of the deflection bar unit of the invention, generally designated by the reference numeral 10, as operatively applied to a well known type of engine-propelled, ski type of winter recreational or sporting vehicle, commonly known as a "snowmobile;" and it is contemplated that such unit 10 will be inexpensively produced with minor adaptations as to shape, size and the like, such as will adapt it for mounting to any of these various makes now on or to be on the market.

As typically illustrated herein, the vehicle, as generally designated 12, comprises a body structure having a forward hood or bonnet 13 of a convexly rounded and forwardly pointed, semi-ogive outline, being topped by a curved upright windshield or visor 14, usually of transparent molded plastic. The vehicle also affords the usual seat 16 for a driver and passenger behind him, as backed by a cushion 17; and steering skis 18 and rigid trailing support skis 19 complete the altogether conventional structure of the snowmobile 12.

Pursuant to the invention the protective bar unit 10 comprises an upright, relatively rigid and fixed mounting member or mast part 20 in the form of an elongated tube of stainless steel or aluminum, in either case attractively finished on its exterior. This tubular upright has an integral, welded or other rigid but finished connection at 21 to the mid-point of a rigid transversely extending mounting base or yoke bar 22, also having an attractive exterior finish. Yoke 22 is suitably contoured to mate flush and flatwise across the surface of the vehicle hood 13, being preferably downwardly offset angularly at its ends 23 for this fit, where it is rigidly connected permanently, as by rivets 24 or the like, to the sides of the hood 13. Of course, the connection may be a removable one, if desired.

The height of the tubular mounting member or lower mast part 20 is such that its open top extends a bit above the top of the windshield 14; and it telescopingly receives at this top opening a downwardly and forwardly offset mast portion 26 integral with a mildly L-shaped tubular protector or deflector member, generally designated 27. This member is usually and by preference of the same tubular stock and finish as the upright mount part 20, but naturally of a sufficiently smaller outer diameter to permit a snug but readily slidable fit into the latter.

A suitable set-screw 28 presenting a knurled finger-piece 29 is threaded into the upright mounting or mast tube 20, adjacent the top thereof and somewhat above the top of the windshield 14, the screw 28 engaging against the forward, downwardly extending mast portion 26 of the member 27. This allows an up or down adjustment of the last named member as a whole between the positions illustrated in solid and dotted line in FIG. 1, followed by its clamping securement by screw 28 to the member 20 in a desired position of elevation relative to the driver's head.

Another adjustable feature of the deflector bar structure 10 is made possible by an elongated, finished tubular extension piece 32 for the deflector member 27. This telescopes into the rear of the member 27, the fit being a snug but readily slidable one; and the extension part 32 is held in a fixed, desiredly adjusted position by means of a manually operated set-screw 34 threaded into the horizontal deflector member 27 adjacent the latter's rear end, in the same fashion as the forward set-screw 28.

The longitudinal, front-to-rear adjustability afforded by the extension piece 32 to a length indicated in dotted line in FIG. 1, enables the protection afforded by the unit 10 to be extended to an occupant seated to the rear of the driver in any position of vertical adjustment of the deflector member 27. As indicated above, the latter and its extension part 32 may be removed as a unit from the forward mast member 20 is desired.

Figure 5:
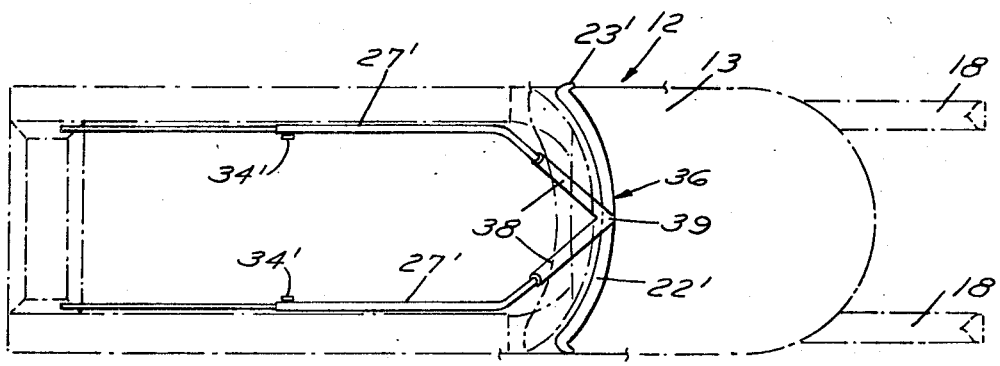
FIG. 5 is a top plan view of the unit shown in FIG. 4.

FIGS. 4 and 5 illustrate a modified, dual bar embodiment of the unit, generally designated by the reference numeral 36, which enables the driver of the vehicle to assume a standing position as well as a kneeling one, without head interference and in many cases without need for adjustment of the parts of the unit 36, save as called into play at the wish of the operator. Inasmuch as specific structural features of the unit 36, other than the duality thereof, closely resemble what is shown and described in reference to FIGS. 1, 2 and 3, such corresponding parts and relationships are designated by corresponding reference numerals, primed, and further description thereof is dispensed with.

Thus, the unit 36, as depicted in FIGS. 4 and 5, comprises a pair of identical tubular uprights 38 arranged in a downwardly convergent, V-shaped relationship to one another, having a common welded or other preferably integral union at 39 to the center of the transverse mounting bar 22', the latter being fixedly secured to the vehicle hood 13' in the fashion described above in reference to FIGS. 1, 2, and 3. Generally L-shaped tubular deflector bar members 27' telescopingly mount into the tops of the upright mast components 38 of unit 36, and are adjustably clamped thereto by set-screw connections at 28', in the manner previously described. Likewise, an extension piece 32' takes slidably into each of the bar members 27', being adjustably secured thereto by set-screw means 34' as previously described.

All of the advantages of the single bar unit 10 of FIGS. 1–3 are enjoyed in common by the dual bar embodiment 36 of FIGS. 4 and 5, plus the further advantage of unimpeded head room in either a sitting or kneeling, and in many cases standing, posture of the driver.

What is claimed is:

1. A protective deflector bar unit for a driver-operated ground vehicle equipped with a forward windshield, comprising a relatively rigid mounting member having means to attach the same to said vehicle, said mounting member being of a height to extend substantially upwardly of a zone forward of the windshield, at least one generally horizontally disposed deflector member carried at a forward end thereof by said mounting member, said deflector member being in telescoped relation to and being located by said mounting member to extend rearwardly of the vehicle window and at a substantial elevation above said windshield and the driver's normally occupied space, and means to adjust the telescoped position of said deflector member on said mounting member to thereby adjustably shield said driver's space at selected locations relative to the latter.

2. The unit of claim 1, in which said adjustment of the position of said deflector member is a vertical adjustment.

3. The unit of claim 2, and further comprising means to vary the effective rearward length of the deflector member as carried by said mounting member.

4. The unit of claim 3, in which said means to vary the deflector length comprises an extension piece slidably carried for telescoping adjustment on the rear end of said deflector member.

5. The unit of claim 3, in which there are two of said deflector members carried by said mounting member to extend generally rearwardly and parallel to one another on either side of the driver-occupied space.

6. The combination of a unit in accordance with claim 3, with said vehicle, the vehicle being a ski-mounted one.

7. The unit of claim 2, in which there are two of said deflector members carried by said mounting member to extend generally rearwardly and parallel to one another on either side of the driver-occupied space.

8. The deflector bar unit of claim 7, in which said attaching means comprises a transverse member rigidly secured to said vehicle directly forward of the latter's windshield, having means at its ends to rigidly secure it to said vehicle, said deflector members being rigidly secured in V-shaped relation to one another to said transverse attaching member at the midpoint of the latter.

9. The unit of claim 1, and further comprising means to vary the effective rearward length of the deflector member as carried by said mounting member.

10. The unit of claim 9, in which said means to vary the deflector length comprises an extension piece slidably carried for telescoping adjustment on the rear end of said deflector member.

11. The unit of claim 9, in which there are two of said deflector members carried by said mounting member to extend generally rearwardly and parallel to one another on either side of the driver-occupied space.

12. The combination of a unit in accordance with claim 9, with said vehicle, the vehicle being a ski-mounted one.

13. The combination of a unit in accordance with claim 1 with said vehicle, the vehicle being a ski-mounted one.

14. The deflector bar unit of claim 1, in which said attaching means comprises a transverse member rigidly secured to said vehicle directly forward of the latter's windshield, having means at its ends to rigidly secure it to said vehicle.

* * * * *